US006408792B1

(12) United States Patent
Markels, Jr.

(10) Patent No.: US 6,408,792 B1
(45) Date of Patent: *Jun. 25, 2002

(54) METHOD OF INCREASING SEAFOOD PRODUCTION IN THE BARREN OCEAN WITH A FERTILIZER COMPRISING CHELATED IRON

(76) Inventor: Michael Markels, Jr., 6850 Versar Center. P.O. Box 1549, Springfield, VA (US) 22151

( * ) Notice: Subject to any disclaimer, the term of this patent is extended or adjusted under 35 U.S.C. 154(b) by 0 days.

This patent is subject to a terminal disclaimer.

(21) Appl. No.: 09/982,197

(22) Filed: Oct. 19, 2001

Related U.S. Application Data

(63) Continuation of application No. 09/761,680, filed on Jan. 18, 2001, which is a continuation of application No. 09/521,895, filed on Mar. 9, 2000, now Pat. No. 6,200,530, which is a continuation of application No. 09/304,063, filed on May 4, 1994, now Pat. No. 6,056,919, which is a continuation of application No. 08/950,418, filed on Oct. 24, 1997, now Pat. No. 5,467,087.
(60) Provisional application No. 60/033,018, filed on Dec. 17, 1996.

(51) Int. Cl.[7] .............................................. A01K 61/00
(52) U.S. Cl. ........................ 119/231; 119/215; 119/230
(58) Field of Search ................................ 119/231, 230, 119/215, 200

(56) References Cited

U.S. PATENT DOCUMENTS

| | | | |
|---|---|---|---|
| 976,793 A | 11/1910 | Ellis | |
| 2,181,882 A | 12/1939 | Flower | |
| 4,066,462 A | * 1/1978 | Horiguchi et al. | 106/14.34 |
| 4,137,869 A | 2/1979 | Kipping | |
| 4,189,379 A | 2/1980 | Finley | |
| 4,235,043 A | 11/1980 | Harasawa et al. | |
| 4,394,846 A | 7/1983 | Roels | |
| 4,579,579 A | 4/1986 | Kerr | |
| 4,581,846 A | 4/1986 | Stensaas | |
| 4,597,883 A | * 7/1986 | Lengyel | 252/70 |
| 4,755,397 A | 7/1988 | Eden et al. | |
| 4,911,952 A | * 3/1990 | Doane et al. | 264/4.1 |
| 5,143,020 A | 9/1992 | Patrick | |
| 5,322,035 A | 6/1994 | Hawes et al. | |
| 5,342,525 A | 8/1994 | Rowsell | |
| 5,433,173 A | 7/1995 | Markels, Jr. | |
| 5,535,701 A | * 7/1996 | Markels, Jr. | 119/231 |
| 5,567,221 A | * 10/1996 | Larson et al. | 119/212 |
| 5,613,465 A | * 3/1997 | Moore | 119/230 |
| 5,965,117 A | 10/1999 | Howard et al. | |
| 5,967,087 A | 10/1999 | Markels, Jr. | |
| 5,992,089 A | 11/1999 | Jones et al. | |
| 6,200,530 B1 | 3/2000 | Markels, Jr. | |
| 6,056,919 A | 5/2000 | Markels, Jr. | |
| 2001/0002983 A1 | 6/2001 | Markels, Jr. | |

FOREIGN PATENT DOCUMENTS

| | | | |
|---|---|---|---|
| CA | 467369 B1 | 8/1950 | |
| JP | 46-83273 A1 | 7/1973 | |
| SU | 1199-223 A1 | 2/1984 | |

OTHER PUBLICATIONS

Dennis A. Hansell, Nicholas R. Bates and Craig A. Carlson, "Predominance of vertical loss of carbon from surface waters of the equatorial Pacific Ocean", Nature. vol. 336, pp 59–61 (Mar. 6, 1997).

Bruce W. Frost, "Phytoplankton Bloom on Iron Rations", Nature, vol. 383, pp. 475–476 (Oct. 10, 1996).

Michael J. Behrenfeld et al., "Confirmation of Iron Limitation of Phytoplankton Photosynthesis in the Equatorial Pacific Ocean", Nature, vol. 383, pp. 508–511 (Oct. 10, 1996.

D.J. Cooper et al., "Large Decrease in Ocean–Surface CO2 Fugacity in Response to In–situ Iron Fertilization", Nature, vol. 383, pp. 511–513 (Oct. 10, 1996).

Kenneth H. Coale et al., "A Massive Phytoplankton Bloom Induced by an Ecosystem–scale Iron Fertilization Experiment in the Equatorial Pacific", Nature, vol. 383, pp. 495–501 (Oct. 10, 1996).

Suzanne M. Turner et al., "Increased Dimethyl Sulphide Concentrations in Sea Water from In–situ Iron Enrichment", Nature, vol. 383, pp. 513–517 (Oct. 10, 1996).

Jocelyn Kaisler, editor, "Oceanographers' Green Thumb", Science, vol. 269, p. 759 (Aug. 11, 1995).

Alasdair Palmer, "The man who says he can save the planet", The Sunday Telegraph, Jul. 23, 2000.

David Tolmazin, "Elements of Dynamic Oceanography", pp. 22–23 (1985).

Richard A. Kerr, "Iron Fertilization: A Tonic, but No Cure for the Greenhouse", Science, vol. 263, pp. 1089–1090 (Feb. 25, 1994).

J.H. Martin et al., "Testing the Iron Hypothesis in the ecosystems of the equatorial Pacific Ocean", Nature, vol. 371, pp. 123–129 (Sep. 8, 1994).

Howard E. Worne, "Introduction to Microbial Biotechnology including Hazardous Waste Treatment", pp. 19 and 46 (1992).

* cited by examiner

Primary Examiner—Charles T. Jordan
Assistant Examiner—Judith A. Nelson
(74) Attorney, Agent, or Firm—Bacon & Thomas, PLLC

(57) ABSTRACT

A method of increasing seafood production in the oceans comprises testing the water at the surface of the ocean in order to determine the nutrients that are missing, applying to the surface of the ocean a first fertilizer that comprises an iron chelate, and harvesting the increased production of seafood that results. The method may further comprise applying a microorganism that fixes nitrogen such as phytoplankton, applying additional fertilizers, and seeding the ocean with fish. Each fertilizer releases the nutrient(s) over time in the photic zone and in a form that does not precipitate before use by the phytoplankton.

20 Claims, No Drawings

METHOD OF INCREASING SEAFOOD PRODUCTION IN THE BARREN OCEAN WITH A FERTILIZER COMPRISING CHELATED IRON

This application is a cont. of Ser. No. 09/761,680 filed Jan. 18, 2001, which is a cont of Ser. No. 09/521,895 filed Mar. 9, 2000, U.S. Pat. No. 6,200,530, which is a cont of Ser. No. 08/304,063, filed May 4, 1994, U.S. Pat. No. 6,056,919 which is a con of Ser. No. 08/950,418 filed Oct. 24, 1997 U.S. Pat. No. 5,467,087 Provisional application Ser. No. 60/033,018 filed Dec. 17, 1996.

BACKGROUND OF THE INVENTION

The field of the invention is the production of seafood.

The earliest history of the human race shows us as hunter-gatherers, who took what the land produced for our own purposes. These hunter-gatherers were part of the natural scene rather than changing the natural scene for their own purposes. About 7,000 to 8,000 years ago in the Middle East, this changed with the domestication of wild animals, such as the cow, pig, goat, sheep and dog. At that point, our ancestors began herding domestic animals to the best pastures with changing seasons and conditions. Our ancestors continued to hunt and gather food, but found herding more productive. This trend continued with the domestication of the horse in the arid regions of Western Asia.

Then about 5,500 years ago, a new invention swept the then-civilized world. This invention was the mold-board plow, which increased the productivity of a farmer by about a factor of seven. It also changed the way we looked at the land, from passive acceptance to active intervention. This change resulted in the planting of favorite crops, rather than accepting what had always grown there. Our ancestors also began to add water and nutrients to the soil, to further increase productivity.

These transitions were not always smooth or without controversy. For many years, there was a free range in the Western states of the United States of America. At that time, some argued strongly against fences, roads, houses, farms and railroads. They argued that cities would follow such encroachments on the free range, and they were right.

While such transitions have progressed considerably on the land resulting in an increase in output of about two thousand times, they have hardly begun on the oceans which cover almost three fourths of the earth's surface. A similar return in the increased productivity of the oceans may be achieved by similar changes.

The fishermen and the fisherwomen of the world have known for many years that there is a great variation in the productivity of the different areas of the oceans and other bodies of water. Recently, the extent of this variation has been measured and the reasons for it determined. It is now known that about 60% of all life in the ocean arises from 2% of the ocean surface. Thus, the ocean may be considered as a vast barren desert with only a few verdant zones where life abounds. These verdant zones are easy to spot. For most of the ocean surface, you can see about 150 to 300 feet (about 46 to 91 meters) through the water, as you can see in the Gulf Stream. In contrast, you can see only a few feet through the water in the productive zones of the oceans because the living matter in the water is so dense. This is the case in the natural upwelling off the coast of Peru.

Samples have been taken from these productive zones, and from other areas of the ocean. The difference has been determined. The productive zones of the ocean are rich in iron, phosphorus, nitrogen and trace minerals, while the rest of the ocean is missing one or more of these elements. These fertilizing minerals are required in order to obtain the maximum production of seafood from a given area in the ocean. There is considerable variance in the nutrients present in different zones of the ocean surface, and samples must be taken and analyzed in order to ascertain the exact level of nutrients required to obtain the productivity of the Peruvian upwelling.

The oceans differ from the land in several regards: (1) there is never a drought in the oceans; (2) the oceans move; and (3) the oceans mix both vertically and horizontally. The first difference means that the oceans need only minor constituents in order to achieve improved productivity. The second difference means that the fertilization may be carried out at a location that is quite distant from the location where the harvesting of seafood is carried out. The third difference means that the fertilization must be carried out on a large scale, or the results of the fertilization may be impossible to find.

Methods of increasing seafood production in the ocean are disclosed by U.S. Pat. Nos. 5,433,173 and 5,535,701, which are hereby incorporated by reference.

SUMMARY OF THE INVENTION

A method of improved production of seafood in the open ocean is achieved by (1) testing the water at the ocean surface in order to determine the nutrients that are missing or are in too low concentration, (2) using a fertilizer that releases an appropriate amount these nutrients over time and in a form that remains available to the phytoplankton (for example, the nutrients should not leave the photic zone by precipitation to any substantial extent) to fertilize the ocean, (3) seeding the fertilized ocean with favored phytoplankton and fish and (4), harvesting the seafood that is produced by the fertilization. The testing may be carried out by any of a number of methods that are known to one of ordinary skill in the art, in order to ascertain the nutrients that are missing to a significant extent from the water. A nutrient is missing to a significant extent, if the production of seafood would be reduced to a significant extent by the level of the nutrient in the water. An appropriate amount of a missing nutrient is an amount to raise the concentration of the nutrient at the ocean surface so that the production of seafood is no longer reduced to a significant extent by the concentration of the nutrient.

The fertilization of the barren ocean to increase seafood production may be carried out with a fertilizer system that comprises one or more fertilizers. If the ocean water is missing nitrates, then the fertilizers should comprise nitrogen-fixing microorganisms, such as blue green algae and phytoplankton (such as Trichodesmium) which fix nitrogen in the open ocean, and sufficient nutrients to cause the bloom of these microorganisms should these microorganisms be missing or be in too low a concentration. The addition of iron may be the only nutrient required to cause blue green algae and phytoplankton (such as Trichodesmium) to bloom and to fix nitrogen but iron must be added in a form that protects the iron from reaction with the ocean water so that the iron does not precipitate but remains in the photic zone where it can fertilize the ocean plant life. This can best be done by adding iron in a form of a chelate. If needed, the chelate may be added in slow release pellets to release the iron slowly into the ocean water.

The fertilizer system should provide the other (non-nitrate and non-iron) nutrients that are missing from the ocean water. Since these nutrients, principally phosphate, may react with the iron chelate if the concentrations of the phosphate and the iron chelate in the ocean water are both high, these other nutrients should also preferably be added to the ocean water in the form of slow release pellets, or in the case of phosphoric acid, a dilute solution may be used. These slow release pellets should release each fertilizing element into the photic zone in a form that does not precipitate or otherwise remove these elements from the photic zone. This can be done by applying the phosphate and/or iron fertilizer separately from the other nutrient fertilizer, such as from opposite sides of a large boat, or from companion boats.

The fertilizer pellets are compounded to achieve a density of less than seawater so that they float, releasing their fertilizing elements at or near the ocean surface. This can be done by attaching the fertilizing elements to a float material such as glass or ceramic bubbles, and plastic foam, or by introducing gas bubbles into the fertilizer pellets during manufacture. The fertilizer pellets may also comprise a binder such as plastic, wax, high molecular-weight starch or a combination thereof, which provides the timed release of the fertilizing elements to the ocean water.

Many areas of the ocean that may be suitable for increasing seafood production by this method do not have indigenous fish populations that can prosper from the increased plant life produced. Therefore, it may be useful to seed the fertilized ocean with selected fish species such as filter feeders that can eat the phytoplankton and zooplankton produced. The harvesting of these seeded fish stocks and other pelagic and migratory fish attracted to the fertilized ocean area may be carried out at the point of application of the fertilizer system, but at a later time, or when ocean currents are involved, the harvesting may be carried out at a point downstream of where the fertilizers are applied, and downstream of where any seeding occurs.

DETAILED DESCRIPTION OF THE INVENTION

Ocean fertilization according to the present invention would greatly increase the productivity of seafood from the oceans. (The term "oceans" also includes seas, bays and other large bodies of water). For example, ocean fertilization along the Atlantic and Pacific coasts of the United States could increase the productivity off these coasts up the level that occurs naturally off the coast of Peru. This could increase the productivity of seafood along the Atlantic and Pacific coasts of the United States by a factor of 30 or more, and thereby provide thousands of new jobs and revitalize a fishing industry that is in decline in some areas of the United States, while at the same time generating a high quality protein food for both domestic consumption and export. Ocean fertilization could also increase the fish catch off the coasts of other countries with the same benefits.

The ocean fertilization could take place within national waters, thereby assuring that the benefits of the increased production of seafood would inure to the benefit of the fishing industry of the country that engages in the ocean fertilization. For example, all of the fertilization by the United States could take place within the 200 mile (about 323 kilometer) limit, so that essentially all of the impact would be within U.S. waters.

The basic parameter of ocean fertilization is that about 1 pound (about 0.45 kilogram) of fertilizer produces about 2 to 10 tons (about 1.8 to 9.1 metric tons) of biomass in the ocean. A conservative estimate would be that a ton (about 0.9 metric ton) would produce about 4,000 tons (about 3,600 metric tons) of biomass in the ocean.

The productivity per surface area should be higher in the fertilized ocean, as compared to the fertilized land. Sugar cane cultivation currently produces about 40 tons per acre (about 36 metric tons per 0.4 hectare) per year. If the same rate of production is achieved in ocean fertilization, this would be about 25,600 tons per square mile (about 23,300 metric tons per 2.6 square kilometers) per year.

On the land, fertilization is almost always accompanied by planting. In the ocean, the fertilization may be combined with the introduction of algae, egg masses and other organisms, including juvenile fish from hatcheries. This may further increase the production of seafood from the ocean.

On the land, the planting and fertilization are usually carried out in the spring, and the harvesting is usually carried out in the fall. In ocean farming, the amount of time between fertilization and harvesting depends on a number of factors. When fertilizing elements are available the phytoplankton in the tropical ocean increases by a factor of two to four each day. Then zooplankton graze on the phytoplankton, the bait fish eat the zooplankton and phytoplankton, and on up the food chain to the large mammals and fish. Off the coasts of the United States, the most significant currents are the Gulf Stream and the Japanese current. Each of these flow at about 4 miles per hour (about 6.4 kilometers per hour). Thus, fertilization at one location of the ocean surface in either of these currents, will produce results for harvesting at another location downstream. A delay time of about four days would be about 400 miles (about 645 kilometers) at about 4 miles per hour (about 6.4 kilometers per hour). For the Gulf Stream, this means that fertilization off of Key West, Florida, would result in improved fishing off of north Florida, with the larger fish coming in off the coasts of Georgia, South Carolina, North Carolina and Virginia. The improved fishing could continue for many miles of the Gulf Stream depending on how the fertilization was carried out.

Testing may determine that ocean fertilization in the Gulf Stream may be carried out even earlier, such as off the west coast of Florida, so that the phytoplankton bloom is already underway by the time the Gulf Stream rounds Key West, Florida. This would allow more time to harvest the larger fish off the East Coast of the United States before the Gulf Stream veers east out of the national waters of the United States.

In the Gulf Stream, the fertilizer is expected to consist primarily of iron with some phosphates and some nitrogen fixing microorganisms, in order to bring the nutrient content up to the level of the Peruvian upwelling. The ocean fertilization should be monitored by testing because the Gulf Stream is complex with swirls and eddies along the coast, and there are the effects of storms, tides and occasional hurricanes. However, the result of ocean fertilization is almost certainly that phytoplankton will grow, and the rest will follow.

Ocean fertilization is effective only in the upper level of the ocean, and preferably in the top about 100 feet (about 30 meters) of the ocean. Therefore the preferred method of ocean fertilization will be to produce a fertilizer pellet that floats with a density less than seawater, and preferably about 0.9 times that of seawater. This can be accomplished by using low density materials in the formulation like waxes, by latching the fertilizer to a float material such as glass or ceramic bubbles, and plastic foam, or, preferably, by including gas bubbles in the form of ceramic balloons or gas bubbles in a plastic matrix in the fertilizer pellet. Where the mixing layer is shallow, it may be possible to disperse soluble fertilizers, such as phosphoric acid, directly into the wake of the boat, and still keep the fertilizer in the photic zone.

The fertilizer will preferably be in a form that will dissolve in the surface water over a period of several days or perhaps as long as two weeks. Therefore, a preferred method of ocean fertilization will include the mixture of the fertilizer with a binder such as a high molecular weight starch, a wax or a plastic matrix such as cellulose acetate so as to produce a fertilizer pellet that releases the fertilizing elements slowly in ocean water. This will keep the concentrations of the fertilizing elements low so they will not react with each other or with the ocean water, forming precipitates and leaving the photic zone.

This is especially important in the case of iron fertilization. Iron can be protected from reaction with the ocean water by adding it to the ocean in the form of a chelate. The chelate may include ethylene-diamine tetraaceticacid (EDTA), lignins and many others. Iron lignins can form precipitates with monoammonium phosphate (MAP) in seawater at concentrations of each, iron and phosphorous, greater than about two parts per million (sixteen parts per million MAP and 18 parts per million iron lignin). These concentrations are not a problem as long as the two fertilizing elements are dispensed separately, as from opposite sides of a boat, or from separate boats. The preferable chelates may include lignin acid sulfonate.

The fertilizing elements are used up in the verdant ocean water in about 20 days. Therefore, continuous additions of fertilizer will be required to maintain the desired ocean productivity.

The thus fertilized ocean may be seeded with desirable fish, including filter feeders such as anchovetta, menhaden and sardines. At a later time special inducements beyond the large availability of bait fish may be included, bringing in higher-value fish such as tuna, swordfish and dolphin.

The amounts of iron, phosphorous and other fertilizing elements added to the ocean will depend on the requirements to increase the production of seafood. The initial method of ocean fertilization should be designed to bring the relevant portion of the ocean surface to the nutrient composition of the ocean surface in the Peruvian upwelling, because of the known production of seafood there. The method of ocean fertilization will preferably include additional testing and studies of the dynamics of seafood growth under the conditions of fertilization, so that further modifications and improvements in the composition of the fertilizer and the method of ocean fertilization can be achieved.

The ocean fertilization of about 53,000 square miles (about 140,000 square kilometers) at a rate of removing about 1,340 million tons (about 1,220 million metric tons) of carbon dioxide ($CO_2$) would initially require about 350,000 tons (about 322,000 metric tons) per year of fertilizer. This is about 1,000 tons (about 900 metric tons) per day for 350 days per year. If the fertilizer applied to the ocean costs about $400 per ton (about 0.9 metric ton), then the cost is about $140,000,000 per year. The cost of ocean fertilization preferably also includes the cost of monitoring, testing and reporting, so as to optimize the method of ocean fertilization, including the optimization of the composition of the fertilizer, the application rate and the location of application.

The present method of improved production of seafood would have a significant impact, The production of 50,000,000 tons (about 45,000,000 metric tons) per year of additional seafood along one coast of the United States would produce a $40,000,000,000 industry if the value of the seafood averages $0.40 per pound (0.45 kilograms). This would create 800,000 new jobs if there was one job for each $50,000 in sales per year.

The description above is based on the Gulf Stream which flows near the largest centers of population of the United States and has an existing fishing industry, because the data was readily available. However, the present method of improved production of seafood is applicable to other areas well. Modifications of the method will be required depending on the location. For example, the present method is applicable to the island nations of the equatorial Pacific Ocean as well. These nations have very large ocean areas within their Exclusive Economic Zones which could be utilized for this purpose.

Thus, the present method allows for variation, including variation in the composition of the fertilizer, as well as the location and nature of the application of fertilizer, depending on the area of the ocean that is being fertilized.

The present method of ocean fertilization could utilize ships that would be at sea for about 120 days, and have the capacity to carry about 120,000 tons (about 110,000 metric tons) of fertilizer. The ships would be provided with pumps to mix the fertilizer with the seawater, and disperses the mixture into the ocean. Each ship could be provided with 3 pumps of 2,500 horsepower each, in order to spray a mixture of 90% seawater and 10% fertilizer over the stern. Each ship would need to have a capacity of about 600,000 Bbls (about 90,000 kiloliters), which is a medium size tanker.

The fertilizer to be used in the present method of production of seafood will have a number of specifications, such as the rate of release of the fertilizing elements to the ocean water, the chemical form of the fertilizing elements to assure that they remain available to the ocean plant life (phytoplankton), and the separation of the fertilizing elements into individual pellets that are introduced into the ocean some distance apart. Such pellets should have a density of less than seawater so they will gradually release their fertilizing elements at or near the ocean surface.

The seeding of the present method of production of seafood will preferable include seeding with nitrogen-fixing phytoplankton in the broadcast stream of fertilizer pellets. Seeding with desirable fish will also be important since filter feeder fish will generally not be present in the barren open ocean water prior to fertilization. Seeding with other higher value fish may also be practiced in order to maximize the economic return from the venture.

Variations of the invention may be envisioned by those skilled in the art and the invention is to be limited solely by the claims appended hereto.

I claim:

1. A method of increasing seafood production in the ocean comprising the following steps:

(1) testing an area of the surface of the ocean, in order to determine a first nutrient that is missing to a significant extent; and (2) applying a first fertilizer which comprises said first missing nutrient, to fertilize said area of the surface of the ocean with an appropriate amount of said first missing nutrient, wherein said first fertilizer comprises an iron chelate, and said first fertilizer releases said missing nutrient in a form that does not precipitate to any substantial extent; and (3) harvesting at least a portion of the increased production of seafood that results from said fertilization of said ocean.

2. The method of claim 1, wherein said chelate comprises a lignin.

3. The method of claim 2, wherein said chelate comprises lignin acid sulfonate.

4. The method of claim 1, further comprising the following: testing said area of the surface of the ocean, in order to determine a second nutrient that is missing to a significant extent; and applying a second fertilizer which comprises said second missing nutrient, to fertilize said area of the surface of the ocean with an appropriate amount of said second missing nutrient, wherein said first fertilizer is applied separately from said second fertilizer, and said first and second fertilizers release each of said nutrients in a form that does not precipitate to any substantial extent.

5. The method of claim 4, wherein at least one microorganism that fixes nitrogen, is applied with at least one of said fertilizers.

6. The method of claim 5, wherein said microorganism comprises at least one member selected from the group consisting of blue green algae and phytoplankton.

7. The method of claim 1, wherein said step (3) is preceded by the step of seeding the surface of the ocean with at least one species of fish.

8. The method of claim 4, wherein said second fertilizer comprises phosphate.

9. The method of claim 4, wherein said second fertilizer comprises trace minerals.

10. The method of claim 4, wherein said second fertilizer is in the form of pellets, and said pellets comprise a float material selected from gas bubbles and/or low density materials, and said pellets further comprise a binder selected from plastic, wax, high molecular weight starch, or a combination thereof.

11. A method of ocean fertilization comprising the following step: applying a fertilizer to fertilize the surface of the ocean with a first nutrient, wherein said first fertilizer comprises an iron chelate, and said first fertilizer releases said iron in a form that does not precipitate to any substantial extent.

12. The method of claim 11, wherein said chelate comprises lignin.

13. The method of claim 12, wherein said chelate comprises lignin acid sulfonate.

14. The method of claim 11, further comprising: applying a second fertilizer to fertilize said surface of the ocean with a second nutrient, wherein said first fertilizer is applied separately from said second fertilizer, and said first and second fertilizers release each of said nutrients in a form that does not precipitate to any substantial extent.

15. The method of claim 14, wherein at least one microorganism that fixes nitrogen, is applied with at least one of said fertilizers.

16. The method of claim 15, wherein said microorganism comprises at least one member selected from the group consisting of blue green algae and phytoplankton.

17. The method of claim 11, further comprising the step of seeding the surface of the ocean with at least one species of fish.

18. The method of claim 14, wherein said second fertilizer comprises phosphate.

19. The method of claim 14, wherein said second fertilizer comprises trace minerals.

20. The method of claim 14, wherein said second fertilizer is in the form of pellets, and said pellets comprise a float material selected from gas bubbles and/or low density materials, and said pellets further comprise a binder selected from plastic, wax, high molecular weight starch, or a combination thereof.

\* \* \* \* \*